Jan. 10, 1967   M. J. PIROUTEK   3,297,135
HIGH SPEED SYSTEM FOR SPACING AND TIMING THE
DELIVERY OF MOVING ARTICLES
Filed Oct. 11, 1965   2 Sheets-Sheet 1
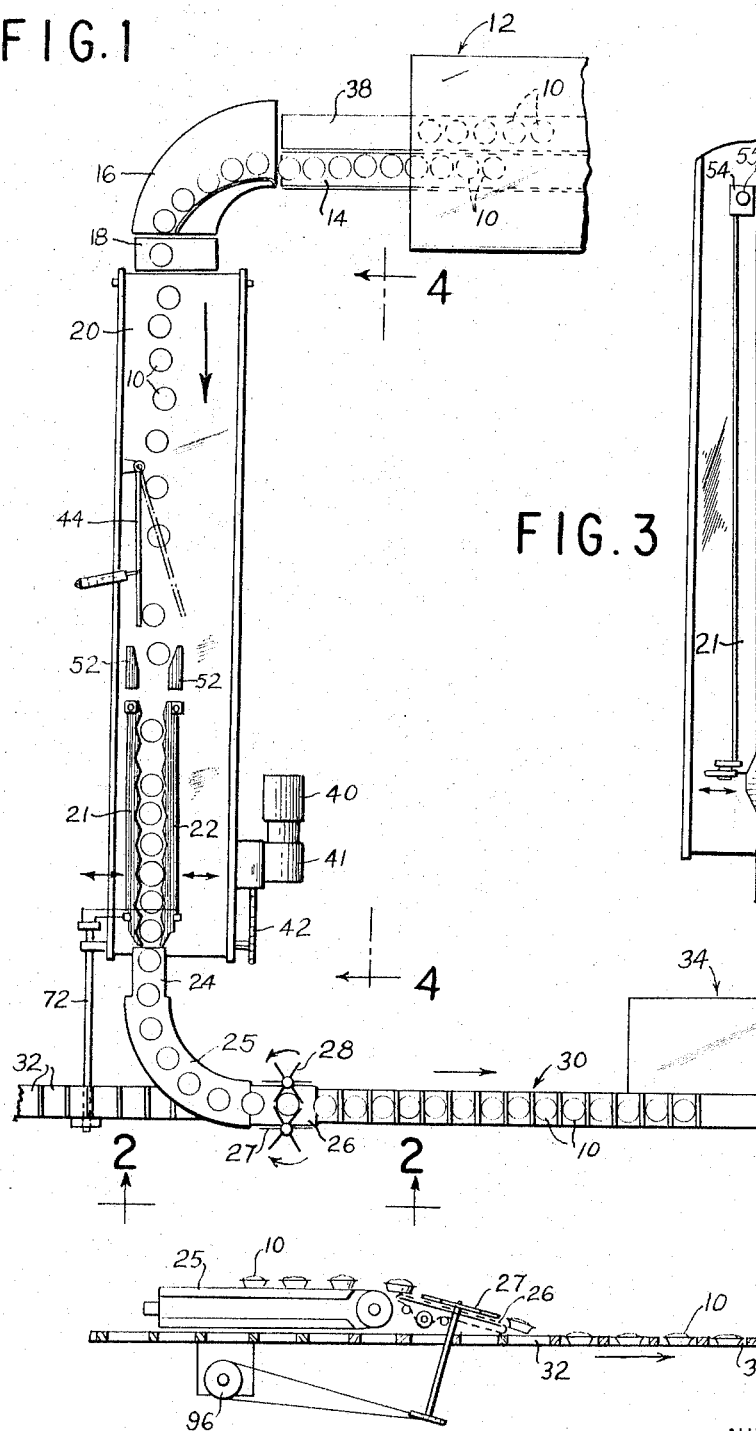
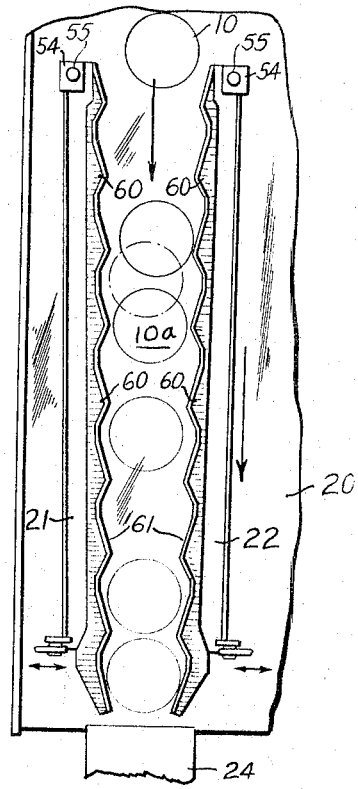
FIG.1
FIG.2
FIG.3
INVENTOR
MIROSLAV J. PIROUTEK
BY
Robertson, Smyth, Bryan & Parmelee
ATTORNEYS Jan. 10, 1967
M. J. PIROUTEK
3,297,135
HIGH SPEED SYSTEM FOR SPACING AND TIMING THE
DELIVERY OF MOVING ARTICLES
Filed Oct. 11, 1965
2 Sheets-Sheet 2
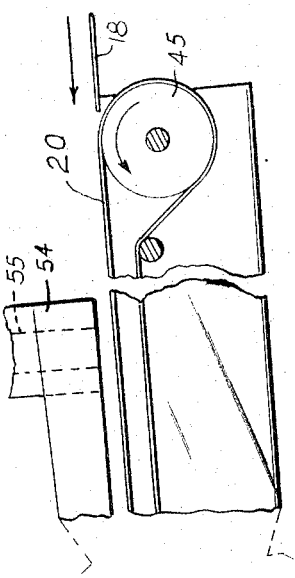
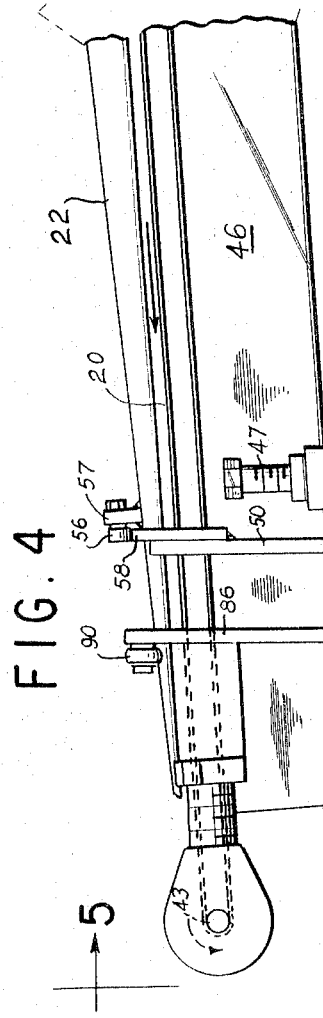
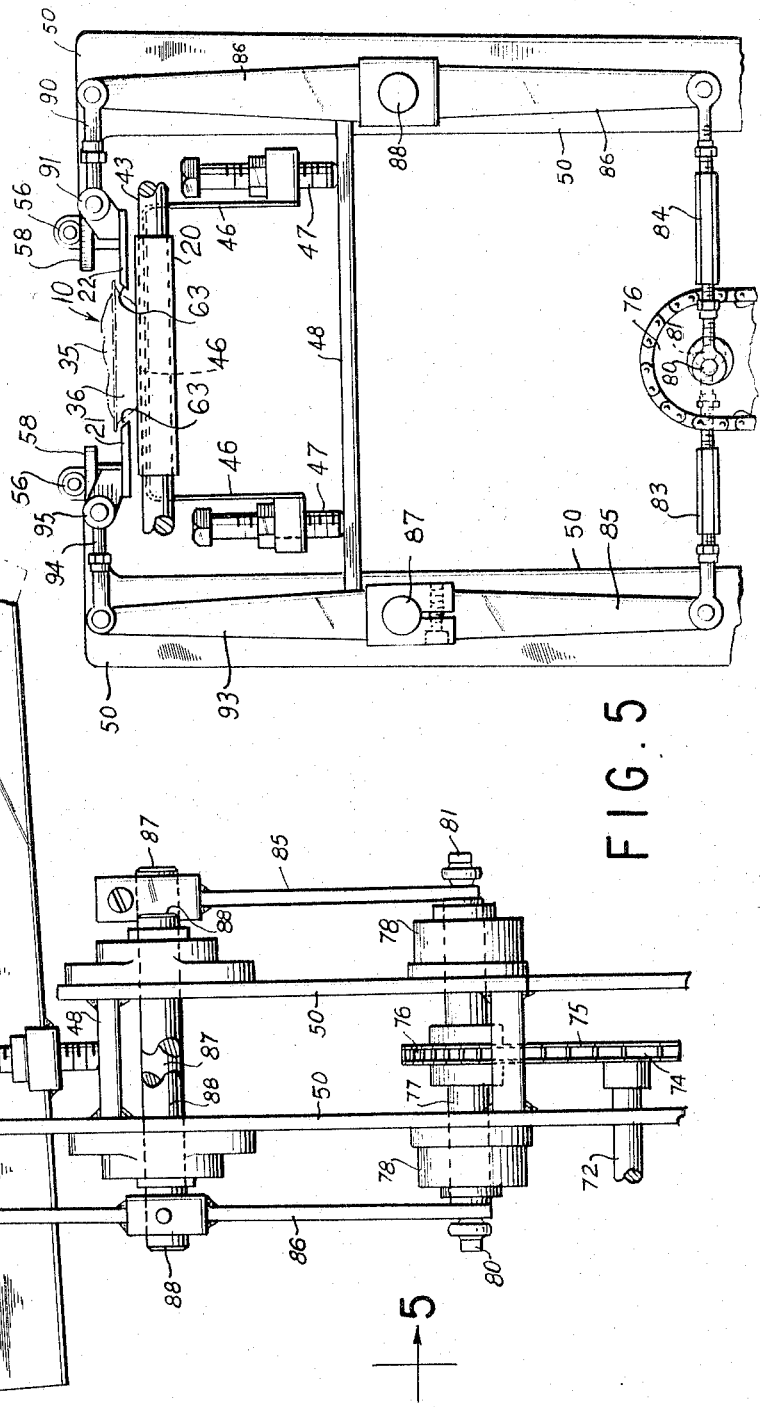
INVENTOR
MIROSLAV J. PIROUTEK
BY
Robertson, Smythe, Bryan & Parmelee
ATTORNEYS

United States Patent Office 3,297,135
Patented Jan. 10, 1967

3,297,135
HIGH SPEED SYSTEM FOR SPACING AND TIMING THE DELIVERY OF MOVING ARTICLES

Miroslav J. Piroutek, Stamford, Conn., assignor to AEL Development and Research Division, Inc., Stamford, Conn., a corporation of Connecticut
Filed Oct. 11, 1965, Ser. No. 494,510
10 Claims. (Cl. 198—34)

The present invention relates to a high-speed system for spacing and timing the delivery of moving articles, and more particularly to such a system for spacing and timing the moving articles by applying a sequence of very brief retarding impulses to each article bringing its movement into the desired time-phase relationship with its neighbors so that the articles become uniformly spaced and delivered at equal time intervals while the system maintains a high output rate.

In the manufacture of numerous types of articles there are often stages of the manufacturing process wherein it is desired to deliver the articles one at a time, uniformly spaced and at equal time intervals to a subsequent manufacturing stage for further operations to be performed. For example, finished articles may be delivered individually and at equally spaced increments to a wrapping machine.

Prior apparatus for accomplishing this spacing and timing of delivered articles has held the articles in a magazine or similar confinement storage mechanism wherein the articles were stationary or intermittently advanced. Then the articles were released one at a time from the confining storage mechanism. The difficulty with this prior storage-release apparatus is that it is forced to operate at a slow output rate, that is, relatively few articles are deliverd per minute, because all of them except the one being released are held stationary or gradually advanced while they are in storage. Also, this prior storage-release apparatus is bulky and complex. Attempts to increase the over-all output rate have usually followed the course of using multiple units operating in parallel feed relationship so that the overall output rate is then the sum total of their individual output.

In accordance with the present invention the articles to be delivered are moved forward along a path by a high-speed conveyor, and a sequence of very brief retarding impulses are applied to each article as it moves along the path. These retarding impulses cause the articles and a high output rate is achieved.
gressively shift along the conveyor toward the desired point relative to the others which are in movement, with the result that they become uniformly spaced and delivered at equal time intervals. Advantageously, there is a continuing forward movement of the series of articles and a high output rate is achieved.

In this specification and in the accompanying drawings, is described and shown a high-speed system for spacing and timing the delivery of moving articles as an illustrative embodiment of the invention, but it is to be understood that this illustrative example is not intended to be exhaustive nor limiting of the invention, but on the contrary is given for purposes of illustration in order that others skilled in the art may fully understand the invention and the manner of applying the invention in practical use and so that they will understand how to modify and adapt it in various forms, each as may be best suited to the conditions of a particular application.

The various objects, aspects, and advantages of this invention will be more fully understood from a consideration of the following specification in conjunction with the accompanying drawings, in which:

FIGURE 1 is a plan view of an article spacing and timing system embodying the present invention;

FIGURE 2 is an end elevational view of a portion of the system of FIGURE 1 as seen in the direction 2—2, and shown on enlarged scale;

FIGURE 3 is an enlarged plan view of a pair of opposed reciprocating jaw members positioned above a conveyor belt;

FIGURE 4 is a side elevational view of FIGURE 1 taken along the line 4—4, presented on further enlarged scale, showing the relationship of the conveyor and belt and reciprocating jaws with their drive mechanism; and FIGURE 5 is an end elevational view of the mechanism of FIGURE 4 as seen from the direction 5—5.

Referring to the drawings in greater detail the manufactured articles 10 are delivered from a batch-production manufacturing stage 12 (FIG. 1) by an outfeed conveyor belt 14 and are fed by a curved chute 16 and a ramp 18 onto a continuously moving main conveyor belt 20. As the articles 10 are propelled forward by the belt 20, a sequence of very brief retarding impulses are applied to each article as will be explained in detail further below by means of a pair of opposed reciprocating jaw members 21 and 22. In this way each one becomes uniformly spaced from its neighbor, and they are delivered from between the jaw members 21 and 22 at equal time intervals at a high over-all output rate.

The uniformly spaced articles 10 slide down a ramp 24 and along conveyor means 25 and then down a slide 26 along a path passing between a pair of contra-rotating star wheels 27 and 28. This pair of star wheels 27 and 28 rotate in timed relationship with a conveyor train 30 having spaced receptacles 32 for receiving the individual articles 10. Thus, the articles are released one at a time by these star wheels 27 and 28 so that they drop off from the edge of the slide 26 into the respective receptacles 32. The conveyor train 30 carries the articles 10 into another manufacturing stage for individual processing, for example, such as wrapping each one.

In this embodiment of the invention the articles 10 are illustratively shown as freshly baked pies 35, as seen most clearly in FIGURE 5 carried in individual disposable pie pans 36, such as thin aluminum pie pans. The manufacturing stage 12 is a cooling tunnel containing two rows of the articles 10 on the respective conveyor belts 14 and 38. As soon as the first row is emptied by the belt 14, then the other belt 38 begins to feed articles onto the chute 16 and so forth in turn. Thus, the articles 10 are fed onto the main conveyor belt 20 at a high over-all delivery rate, which in this example is 160 pies per minute.

The belt 20 is driven by a motor 40 (FIG. 1) through a gear box 41 and a sprocket chain 42 which turns a front roll 43 (FIGS. 4 and 5) carrying the belt 20. The articles 10 move past a deflector guide 44 which may be extended as indicated by the dotted lines so as to move them over onto the side of the conveyor 20 where they are unaffected by the reciprocating jaws 21 and 22. This permits some of the articles to be side-tracked from time-to-time, if desired.

As shown in FIGURE 4, the entire conveyor belt 20 slopes downwardly at a small angle toward the front end roll 43, and the ramp 18 terminates near an upper idler roll 45 which carries the back end of the conveyor belt 20. The belt 20 slides upon an inclined support bed 46 (FIG. 5) which is adjustably mounted by leg bolts 47 engaging a cross brace 48 of the main frame 50.

*Sequence of very brief retarding impulses of increasing magnitude*

The articles 10 are irregularly positioned and spaced on the main belt 20 and in order to bring the movement of each one into the desired relationship with its neighbors a sequence of very brief retarding impulses of increasing magnitude are applied to each of them by means of the reciprocating jaw members 21 and 22. The articles 10 are guided between the upstream ends of the jaw members 21 and 22 by a pair of converging guides 52.

As shown in FIGURES 3 and 4 the upstream ends of the jaws 21 and 22 have bearings 54 mounted on fixed upright pivots 55 so that the downstream ends of these jaws can be swung toward and away from each other as indicated in FIGURES 1 and 3. These jaw members 21 and 22 are positioned in opposed relationship on opposite sides of the path of the articles travelling downstream from the converging guides 52 and they extend parallel with and closely adjacent to the upper surface of the moving conveyor belt 20.

To support the downstream ends of these jaw members 21 and 22 a roller 56 is held by a bracket 57 on each jaw member, and these rollers 56 ride upon short horizontal tracks 58 secured to the frame 50.

Extending along the inner surfaces of each jaw member 21 and 22 are a row of opposed teeth 60 having obtuse angular points with surfaces 61 sloping upstream more gradually than downstream. These gradually sloping surfaces 61 briefly engage each moving article to retard it as the jaw members close toward each other and then release the article as the jaw members swing apart. Each successive retarding engagement is for a slightly larger period because each successive pair of teeth 60 have slightly longer strokes due to their greater distance from the pivots 55. The cumulative effect is to bring the forward movement of each article into the desired time-phase relationship with the others, while maintaining an over-all high output rate.

In order to prevent the teeth 60 from denting one of the articles if it happened to be directly between their points, as indicated at 10a, when the jaws close, yielding means are provided for giving additional clearance at the extreme closure limit of each stroke. In this example, as shown in FIGURE 3, the yielding means comprises an outward and upward flaring surface 63 on the tooth surfaces 61. This flare conforms with the flare of the pie pan 36 and so the tendency is to lift the pie pan briefly by camming it upwardly.

In order to reciprocate the arms 21 and 22 toward and away from each other, a reciprocating drive mechanism 70 is provided as shown in FIGURES 4 and 5. This drive mechanism 70 is coupled to the conveyor train 30, as indicated in FIGURE 1 by a drive shaft 72. Thus the jaw members 21 and 22 oscillate toward and away from each other in a predetermined timed relationship with respect to the movement of the receptacles 32 of the conveyor train. This shaft 72 drives a sprocket 74 connected by a chain 75 to a driven sprocket 76 on an eccentric drive shaft 77 (FIG. 4) which is journaled in a pair of bearings 78 mounted on opposite sides of the frame 50.

At each end of the shaft 77 is an eccentrically positioned crank pin 80 and 81 which are offset diametrically opposite from the axis of rotation of the shaft 77. That is, the movement of the crank pins 80 and 81 is exactly 180° out of phase one with respect to the other. This crank movement of the pins 80 and 81 is transferred up to the jaw members 21 and 22 by connecting rods 83 and 84 connected to levers 85 and 86 which are mounted upon pivot shafts 87 and 88, respectively. The upper end of the lever 86 is attached by means of a connecting rod 90 to a bracket 91 near the downstream end of the jaw arm 72. The other lever 85 is secured to one end of the pivot shaft 87, and the opposite end of this shaft 87 is connected to another lever 93 attached by means of a connecting link 94 to a bracket 95 on the jaw arm 91 directly opposite to the connection point on the other jaw.

In operation as the jaws 21 and 22 swing in and out it will be appreciated that the downstream teeth 60 travel in and out a greater distance than the upstream teeth.

Thus, as the articles travel along their path between these reciprocating jaws they are very briefly engaged and retarded in their movement by the upstream sloping surfaces 61 of the lobes of each pair of opposed teeth. Each successive pair of opposed teeth engage the articles for a slightly longer instant of time to provide a sequence of very brief retarding impulses of increasing magnitude. These impulses have the cumulative effect of shifting the movement of each article slightly with respect to the travelling belt 20 so as to bring its travel into the desired time and space relationship with the travel of the other articles passing between these jaws. One article is released from between the downstream ends of these jaw members 21 and 22 each time the jaw members open up.

In this example the jaws 21 and 22 are oscillating at a rate of 160 strokes per minute corresponding to the desired number of units to be delivered per minute. This corresponds with the number of receptacles 32 which are passing below the end of the slide conveyor 26, and the articles 10 are released from between the ends of the jaws so that each one is timed to drop precisely into one of the moving receptacles 32.

The purpose of the slide conveyor 26 and the contra-rotating star wheels 27 and 28 is to assure that this proper timed relationship is maintained just before the articles are dropped onto the train conveyor 30, as indicated in FIGURE 1. The conveyor 26 and star wheels 27 and 28 are driven by drive means 96 (FIG. 2) to maintain the desired relationship to the movement of the conveyor train 30.

There may occur an occasional gap in the sequence of articles 10 being delivered, because there was too great a spacing between them on the upstream end of the main belt 20. This absence of an occasional article does not interfere with the operation of the conveyor train 30 or processing stage 34, it merely leaves an empty receptacle 32. The processing stage 34 skips the empty receptacle 32 and goes on to process the next article in the sequence.

In actual practice it has been found that this system does operate extremely well at a high over-all output rate.

As used herein the term "reciprocating" is intended to include back-and-forth linear movement and swinging movement and back-and-forth movement having components of either linear or swinging motion or both.

From the foregoing it will be understood that the high-speed system for spacing and timing the delivery of moving articles embodying the present invention described above is well suited to provide the advantages set forth, and since many possible embodiments may be made of the various features of this invention and as the systems and apparatus herein described may be varied in various parts, all without departing from the scope of the invention, it is to be understood that all matter hereinbefore set forth or shown in the acompanying drawings is to be interpreted as illustrative and not in a limiting sense and that in certain instances, some of the features of the invention may be used without a corresponding use of other features, all without departing from the scope of the invention as claimed in the following claims:

What is claimed is:

1. A system for spacing and timing the delivery of moving articles comprising a conveyor belt, drive means moving said conveyor belt for advancing the articles along a path, a pair of opposed jaw members movably mounted in opposed relationship on opposite sides of said path, said jaw members having a plurality of opposed inwardly projecting teeth at spaced points along the length of said jaw members, and reciprocating drive means for moving said jaw members toward and away from each other.

2. A system for spacing and timing the delivery of moving articles comprising a conveyor belt, drive means moving said conveyor belt for advancing the articles in a downstream direction along a path, a pair of opposed jaw members movably mounted in opposed relationship on opposite sides of said path, said jaw members having a plurality of opposed inwardly projecting teeth at spaced points along the length of said jaw members, said teeth having rounded points and their upstream and downstream surfaces defining an obtuse angle, and reciprocating drive means for moving said jaw members toward and away from each other.

3. A system for spacing and timing the delivery of moving articles comprising a conveyor belt, drive means moving said conveyor belt for advancing the articles along a path in a downstream direction, a pair of opposed jaw members positioned on opposite sides of said path, said jaw members being elongated in the direction of said path and extending parallel with said conveyor belt, the upstream ends of said jaw members being pivotally mounted on upright pivots and the downstream ends of said jaw members being swingable toward and away from each other, said jaw members having a plurality of opposed inwardly projecting teeth at spaced points along their length, and reciprocating drive means for swinging said jaw members toward and away from each other.

4. A system for spacing and timing the delivery of moving articles comprising a conveyor belt, drive means moving said conveyor belt for advancing the articles along a path in a downstream direction, a pair of opposed jaw members positioned on opposite sides of said path, said jaw members being elongated in the direction of said path and extending parallel with said conveyor belt, the upstream ends of said jaw members being pivotally mounted on upright pivots and the downstream ends of said jaw members being swingable toward and away from each other, said jaw members having a plurality of pairs of opposed inwardly projecting teeth at spaced points along their length, the upstream and downstream surfaces of each tooth defining an obtuse angle, the upstream surfaces of each pair of teeth converging toward said path more gradually than the downstream surfaces of each pair of teeth diverge from said path, and reciprocating drive means for swinging said jaw members toward and away from each other.

5. A system for spacing and timing the delivery of moving articles comprising a conveyor belt, drive means moving said conveyor belt for advancing the articles along a path, said conveyor belt being inclined downwardly in the direction of movement of the articles along said path, a pair of opposed jaw members movably mounted in opposed relationship on opposite sides of said path, said jaw members extending along beside said path, in the direction of movement of the articles along said path and each of said jaw members having a plurality of inwardly projecting teeth at positions spaced along its length, each tooth on one of said jaw members being directly opposite a tooth on the other of said jaw members, and reciprocating drive means for moving said jaw members toward and away from each other.

6. A high-speed system for uniformly spacing and timing the delivery of pies individually carried in pie pans having upwardly and outwardly diverging side surfaces comprising a conveyor belt, drive means moving said conveyor belt for advancing the pies along a path in a downstream direction, a pair of opposed jaw members positioned on opposite sides of said path, said jaw members extending along beside said path in the direction of said path and extending along near said conveyor belt, the upstream ends of said jaw members being swingably mounted and the downstream ends of said jaw members being swingable toward and away from each other, each of said jaw members having a plurality of inwardly projecting teeth at positions uniformly spaced along their length, each tooth on one jaw member being directly opposite a tooth on the other jaw member forming an opposed pair, the upstream and downstream surfaces of each tooth defining an obtuse angle, the upstream surfaces of each pair of opposed teeth converging toward said path more gradually than the downstream surfaces of each pair of teeth diverge from said path, and reciprocating drive means for swinging said jaw members toward and away from each other.

7. A system for uniformly spacing and timing the delivery of moving articles comprising a conveyor belt, drive means moving said conveyor belt for advancing the articles along a path, said conveyor belt being inclined downwardly in the direction of movement of the articles along said path, a pair of opposed jaw members movably mounted in opposed relationship on opposite sides of said path, said jaw members extending along beside said path in the direction of movement of the articles along said path and each of said jaw members having a plurality of inwardly projecting teeth at positions spaced uniformly along its length, each tooth on one of said jaw members being directly opposite a tooth on the other one of said jaw members, means for reciprocating both of said jaw members toward and away from each other, the reciprocating stroke of said jaw members progressively increasing in the direction of movement of the articles along said path, and yielding means for providing additionl clearance between said teeth to prevent denting any articles directly between a pair of opposed teeth as said jaw members reach the inner limit of their stroke.

8. A high-speed system for uniformly spacing and timing the delivery of pies individually carried in pie pans having upwardly and outwardly diverging side surfaces comprising a conveyor belt, drive means moving said conveyor belt for advancing the pies along a path in a downstream direction, a pair of opposed jaw members positioned on opposite sides of said path, said jaw members extending along beside said path in the direction of said path and extending along near said conveyor belt, the upstream ends of said jaw members being swingably mounted and the downstream ends of said jaw members being swingable toward and away from each other, each of said jaw members having a plurality of inwardly projecting teeth at positions uniformly spaced along their length, each tooth on one of said jaw members being directly opposite a corresponding tooth on the other jaw member forming a pair of opposed teeth, reciprocating drive means for swinging said jaw members toward and away from each other, and the opposed surfaces of said pairs of teeth flaring upwardly and outwardly for camming said pie pans upwardly briefly away from said conveyor belt, by virtue of all of which a sequence of very brief retarding impulses of increasing magnitude is applied to each of said pies for uniformly spacing said pies as they are released at equal time intervals one-by-one from between said jaw members, and a high over-all output rate is provided in the total number of pies being delivered per minute.

9. A high-speed system for uniformly spacing and timing the delivery of pies individually carried in pie pans having upwardly and outwardly diverging side surfaces comprising a conveyor belt, drive means moving said conveyor belt for advancing the pies along a path in a downstream direction, said conveyor belt sloping downwardly in the downstream direction of movement of said pies, a pair of opposed movable jaw members positioned on opposite sides of said path, said jaw members extending along beside said path in the direction of said path and extending along near said conveyor belt, each of said jaw members having a plurality of inwardly projecting teeth at positions uniformly spaced along their length, each tooth on one jaw member being directly opposite a tooth on the other jaw member forming an opposed pair, the upstream and downstream surfaces of each tooth defining an obtuse angle, the upstream surfaces of each pair of opposed teeth converging toward said path more gradually than the downstream surfaces of each pair of teeth diverge from said path, the opposed surfaces of each pair of teeth flaring outwardly and upwardly for camming the pies upwardly upon movement of the pair of teeth toward each other against the side surfaces of the pie pan, and drive means reciprocating said jaw members toward and away from each other with the downstream ends of said jaw members having a greater stroke movement than their upstream ends, by virtue of all of which brief retarding impulses of progressively increasing magnitude are applied to each of said pies for uniformly spacing said pies as they are released from between the downstream ends of said jaw members one-by-one at equal time intervals.

10. A system for uniformly spacing and timing the delivery of moving articles comprising a conveyor belt, drive means for moving the conveyor belt for propelling the articles along a path, retarding means positioned on opposite sides of said path engageable with said articles at a plurality of positions spaced along in the direction of movement of the articles and reciprocating drive means for oscillating said retarding means toward and away from each other briefly engaging the opposite sides of the articles for applying brief retarding impulses to the articles, and the retarding means having progressively greater oscillating strokes in the direction of movement of the articles along said path increasing the extent of the retarding impulses applied to each article as it is propelled along said path for bringing the movement of each article into uniformly spaced relationship with respect to its neighbors as they are delivered at equal time intervals from between said retarding means.

No references cited.

EVON C. BLUNK, *Primary Examiner.*

M. L. AJEMAN, *Assistant Examiner.*